[96.] GEORGE B. GREEN.
Improvement in Saws.
No. 118,800. Patented Sep. 12, 1871.

Frank Stout
Isaac R. Oakford.

George B. Green

UNITED STATES PATENT OFFICE.

GEORGE B. GREEN, OF STAFFORDSHIRE, ENGLAND.

IMPROVEMENT IN SAWS.

Specification forming part of Letters Patent No. 118,800, dated September 12, 1871.

*To all whom it may concern:*

Be it known that I, GEORGE B. GREEN, of Staffordshire, England, have invented a certain Improvement in Saw-Blades, of which the following is a specification:

In the manufacture of saws it has always been considered that a more favorable result is obtained by finishing the sides or flat of the blade as smooth and even as possible; also, frequently giving them a high polish, on the theory that polished saws work free and smooth.

In my improvement I make the saw-blade the very opposite of this by roughening the flat or sides of it, similar to a file or rasp; in fact, my improvement is, practically, a combination of saw and file or rasp.

Figure 1:
Figure 2:
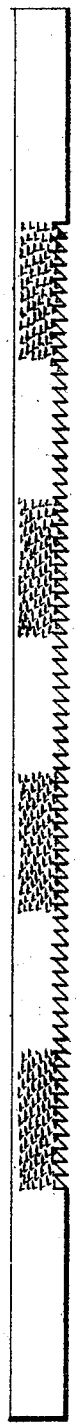

Figure 1 is a side view of a saw-blade, showing the side serrated or roughened. Fig. 2 is a side view of a blade, showing it serrated or roughened in alternate spaces.

The process of manufacturing my saw-blade does not materially differ from the manufacture of other saws only in this, that at some stage during the manipulation previous to the tempering I roughen or serrate the surface of the sides of the blade and of the teeth by punching, cutting, stamping, or by any other suitable means raise or depress, or both, said surfaces in such a way as to render it similar to a file or rasp. This roughening or serrating part of the process may be done either before or after the teeth are cut in the blade. I prefer to roughen the side of a thin blade having fine or many teeth previous to cutting the teeth, as then the surface of the sides of the teeth, as well as of the sides of the blade, are more readily roughened, punched, raised, or depressed, as described. The flat or sides of the blade and the flat or sides of the teeth may be punched, raised, or depressed, or otherwise roughened or serrated, as described, either uniformly all over on both sides, or, where the blade is too thin to allow of this, as in some make of jig or scroll-saws, the sides or flat of the blade may be cut, roughened, or serrated at short intervals on both sides, and in such order that an uncut surface on one side will be alternately opposite a rough or serrated surface on the reverse side of the blade, as shown in Fig. 2 of the drawing.

My improvement is more especially adapted to jig or scroll-saws, as in sawing with the ordinary jig or scroll-saws a difficulty is experienced in the rough surface made by the teeth, and to smooth or finish this rough surface ready for painting or oiling requires considerable labor in rasping, rubbing, scraping, or sand-papering; and, in brackets or any kind of work having narrow or short curves, it is often difficult to reach the rough surface for the purpose of smoothing and finishing. My invention obviates all this and enables the saw to perform the work of smoothing as it proceeds in its work, leaving the wood itself with a uniform and finished surface.

I claim—

A saw made by roughening or serrating, by any suitable means, the sides of the blade, substantially in the manner and for the purpose herein set forth.

GEORGE B. GREEN.

Witnesses:
ISAAC R. OAKFORD,
GEO. CHANDLER PAUL.